United States Patent
Callow

(10) Patent No.: US 8,989,945 B2
(45) Date of Patent: Mar. 24, 2015

(54) SYSTEM VALIDATION

(75) Inventor: Glenn Michael Callow, Bristol (GB)

(73) Assignee: Bae Systems PLC (GB)

( * ) Notice: Subject to any disclaimer, the term of this patent is extended or adjusted under 35 U.S.C. 154(b) by 0 days.

(21) Appl. No.: 13/698,835

(22) PCT Filed: May 17, 2011

(86) PCT No.: PCT/GB2011/050938
§ 371 (c)(1),
(2), (4) Date: Nov. 19, 2012

(87) PCT Pub. No.: WO2011/144929
PCT Pub. Date: Nov. 24, 2011

(65) Prior Publication Data
US 2013/0073138 A1    Mar. 21, 2013

(30) Foreign Application Priority Data
May 19, 2010    (GB) .................................. 1008332.7

(51) Int. Cl.
*G05D 1/00* (2006.01)
*G05B 17/02* (2006.01)
*G05B 13/04* (2006.01)
*G06N 5/00* (2006.01)

(52) U.S. Cl.
CPC *G05B 17/02* (2013.01); *G06N 5/00* (2013.01); *G05D 1/0088* (2013.01); *G05B 13/04* (2013.01)
USPC .................... 701/24; 701/27; 701/23

(58) Field of Classification Search
USPC .............................. 701/23, 24, 27
See application file for complete search history.

(56) References Cited

U.S. PATENT DOCUMENTS

| | | | | |
|---|---|---|---|---|
| 4,488,234 A * | 12/1984 | Stieber et al. | | 701/23 |
| 7,949,997 B2 * | 5/2011 | Chessell et al. | | 717/120 |
| 8,046,733 B2 * | 10/2011 | Weber | | 717/104 |
| 8,078,357 B1 * | 12/2011 | Trytten et al. | | 701/36 |
| 8,155,868 B1 * | 4/2012 | Xing et al. | | 701/36 |
| 8,326,469 B2 * | 12/2012 | Phillips et al. | | 701/2 |
| 8,538,786 B2 * | 9/2013 | Linehan | | 705/7.11 |
| 2002/0026249 A1 | 2/2002 | Rasmussen et al. | | |
| 2007/0021880 A1 | 1/2007 | Appleby et al. | | |
| 2007/0118502 A1 | 5/2007 | Aragones et al. | | |
| 2007/0239314 A1 * | 10/2007 | Kuvich | | 700/245 |
| 2008/0027591 A1 * | 1/2008 | Lenser et al. | | 701/28 |
| 2008/0109475 A1 * | 5/2008 | Burmester et al. | | 707/102 |

(Continued)

OTHER PUBLICATIONS

MDA Guide Version 1.0, Editors Miller and Mukerji, OMG, Document No. omg/2003-05-01, May 1, 2003.*

(Continued)

*Primary Examiner* — Tuan C. To
*Assistant Examiner* — Dale W Hilgendorf
(74) *Attorney, Agent, or Firm* — Maine Cernota & Rardin

(57) ABSTRACT

A method and apparatus for evaluating capabilities of a system (e.g. an autonomous vehicle) with respect to the performance of a task, the method including: providing a first model corresponding to the task; providing a further model corresponding to the system; providing a plurality of mappings from one model to another model; determining whether there exists a transformation trace either (i) from the first model to the further model, or (ii) from the further model to the first model, wherein each transformation trace includes one or more of the specified mappings; and evaluating the capabilities of the system with respect to the task dependent upon the existence of the transformation trace.

15 Claims, 3 Drawing Sheets

(56) References Cited

U.S. PATENT DOCUMENTS

| | | | |
|---|---|---|---|
| 2010/0077386 A1* | 3/2010 | Akkiraju et al. | 717/136 |
| 2010/0088011 A1 | 4/2010 | Bruce et al. | |
| 2010/0128304 A1* | 5/2010 | Ocke et al. | 358/1.15 |
| 2010/0162027 A1 | 6/2010 | McCroskey et al. | |
| 2011/0035803 A1* | 2/2011 | Lucangeli Obes et al. | 726/25 |
| 2011/0179397 A1* | 7/2011 | Pfeifer et al. | 717/104 |
| 2011/0231414 A1* | 9/2011 | Goodwin et al. | 707/752 |

OTHER PUBLICATIONS

Multiple System Collaborative Planning and Sensing for Autonomous Platforms with Shared and Distributed Situaltional Awareness, Petillot et al, 2009, Proceedings of the AUVSI's Unmanned Systems Europe, pp. 1 and 5.*

Publication Details of (Multiple System Collaborative Planning and Sensing for Autonomous Platforms with Shared and Distributed Situaltional Awareness, Petillot et al, 2009, Proceedings of the AUVSI's Unmanned Systems Europe, pp. 1 and 5), HW Ocean Systems Laboratory, screen shot of web page.*

International Search Report (PCT/ISA/210) issued on Jul. 20, 2011, by the European Patent Office as the International Searching Authority for International Application No. PCT/GB2011/050938.

Written Opinion (PCT/ISA/237) issued on Jul. 20, 2011, by the Japanese Patent Office as the International Searching Authority for International Application No. PCT/GB2011/050938.

Great Britain Search Report issued Jan. 28, 2011 for Great Britain Application No. GB1008332.7.

* cited by examiner

SYSTEM VALIDATION

FIELD OF THE INVENTION

The present invention relates to the validation, or assessment, of a system with respect to the goals that the system is tasked to achieve, such as evaluating capabilities of a system with respect to the performance of a task.

BACKGROUND

Typically autonomous systems (e.g. autonomous vehicles) are tasked with achieving goals with reduced (or no) human interaction.

An autonomous system is assessed, or validated, typically by determining whether or not it has the necessary capabilities to support an operator in achieving the task. This validation of an autonomous system is primarily a design-time activity with a focus on ensuring that the system does what a user wants it to do, and that this system is reliable, available, dependable, safe, etc.

However, increasingly autonomous systems are being used in complex and uncertain environments that the system has not been assessed or validated for during the design stage.

SUMMARY OF THE INVENTION

In a first aspect, the present invention provides a method of evaluating capabilities of a system with respect to the performance of a task, the method comprising: providing a first model, the first model corresponding to the task, providing a further model, the further model corresponding to the system, providing a plurality of mappings from one model to another model, determining whether there exists a transformation trace either (i) from the first model to the further model, or (ii) from the further model to the first model, wherein each transformation trace comprises one or more of the specified mappings, and evaluating the capabilities of the system with respect to the task, the evaluation outcome being dependent upon the existence of the transformation trace for the further model.

Evaluating the capabilities of the system with respect to the task may comprise determining whether or not the system is capable of performing the task.

It may be determined that the system is capable of performing the task if the transformation trace exists.

The method may further comprise: specifying a second further model, the second further model corresponding to the system, wherein the step of determining whether there exists a transformation trace comprises determining whether there exists either (i) a transformation trace from the first model to the second further model and a transformation trace from the second further model to the further model, or (ii) a transformation trace from the further model to the second further model and a transformation trace from the second further model to the first model, and each transformation trace comprises one or more of the specified mappings.

A first meta-model may provide a basis for the first model, a second meta-model may provide a basis for the further model, and the step of determining whether there exists a transformation trace may comprise determining whether there exists a transform or mapping from the first meta-model to the second meta-model, wherein a transform or mapping from the first meta-model to the second meta-model provides a basis for the transformation trace either (i) from the first model to the further model, or (ii) from the further model to the first model.

The system may be an autonomous vehicle.

The first model may be a Computation Independent Model.

The further model may be one of the following: (i) a Platform Independent Model, or (ii) a Platform Specific Model.

The method may be implemented using Planning Domain Definition Language.

There may be two further models, one of the two further models is a Platform Independent Model, and the other of the two further models is a Platform Specific Model.

In a further aspect, the present invention provides apparatus for evaluating capabilities of a system with respect to the performance of a task, the apparatus comprising: one or more processors arranged to determine whether there exists a transformation trace either (i) from a first model to a further model, or (ii) from the further model to the first model, and each transformation trace comprising one or more of a plurality of mappings, and evaluate the capabilities of the system with respect to the task, the evaluation outcome being dependent upon the existence of a transformation trace, wherein the first model corresponds to the task, the further model corresponds to the system, and the plurality of mappings are specified from one model to another model.

The system may be an autonomous vehicle.

The apparatus may be onboard the autonomous vehicle.

In a further aspect, the present invention provides a program or plurality of programs arranged such that when executed by a computer system or one or more processors it/they cause the computer system or the one or more processors to operate in accordance with the method of any of the above aspects.

In a further aspect, the present invention provides a machine readable storage medium storing a program or at least one of the plurality of programs according to the above aspect.

DETAILED DESCRIPTION

Figure 1:
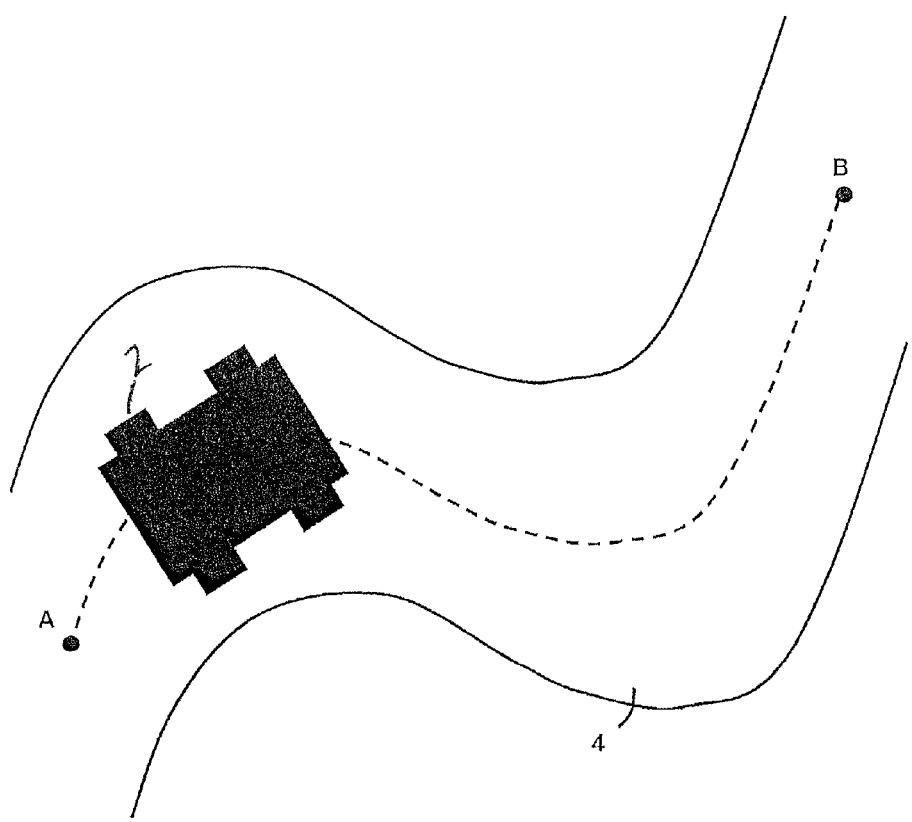
FIG. 1 is a schematic illustration (not to scale) of a scenario in which an embodiment of a method of performing system validation is implemented.

FIG. 1 is a schematic illustration (not to scale) of a scenario in which an embodiment of a method of performing system validation is implemented.

In this embodiment, the framework used for the system validation process is based on the underlying principles associated with Model Driven Architecture (MDA). MDA describes an architectural approach for designing and building systems. More information about MDA may be found in "*MDA Guide* v1.0.1", J. Miller & J. Mukerji, OMG, 2003, which is incorporated herein by reference.

FIG. 1 schematically shows a vehicle 2 which travels along a road 4.

In this embodiment, the vehicle 2 is an autonomous land-based vehicle. The terminology "autonomous" is used herein to refer to a system that, to some extent, operates independently from a human, that may observe and/or affect some environment beyond its system boundary, and that has some capability to make decisions in response to a change in its own state and/or in its environment.

The vehicle 2 will be described in more detail later below with reference to FIG. 2.

In this scenario, the road 4 has a tarmac surface and is five meters wide.

In this scenario, it is a task of the vehicle to navigate itself along the road 4, from a first point A to a second point B. Also, in this scenario the task of the vehicle 2 is carried out under adverse environmental conditions, for example snow, heavy rain, wind, or in the presence of sand.

Figure 2:
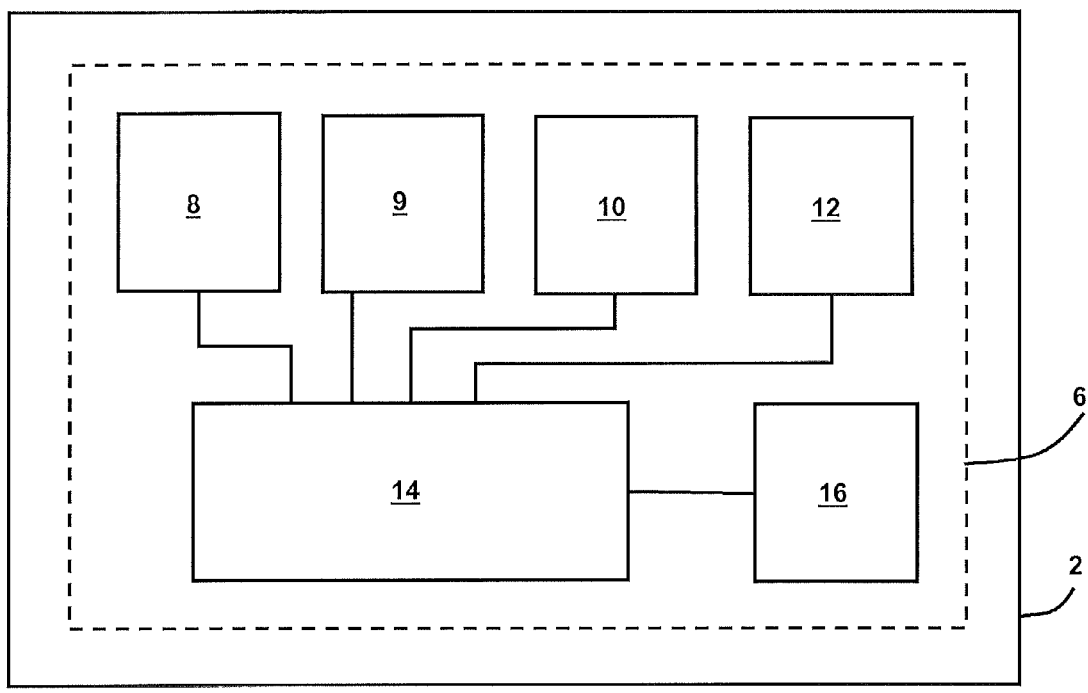
FIG. 2 is a schematic illustration (not to scale) of a vehicle.

FIG. 2 is a schematic illustration (not to scale) of the vehicle 2.

In this embodiment, the vehicle 2 comprises a system for verifying whether the vehicle is capable of performing the task (i.e. travelling from A to B, along the road 4, under adverse environmental conditions). This system is hereinafter referred to as the "vehicle validation system" and is indicated in FIG. 2 by a dotted line and the reference numeral 6.

The vehicle verification system 6 comprises a task model 8, a first vehicle model 9, a second vehicle model 10, a model transform system 12, a controller 14, and a display 16.

The task model 8 is a model that encapsulates the task of the vehicle 2. In this embodiment, the task model 8 is a model that specifies that the vehicle is tasked to travel from the first point A to the second point B along the road 4. The task model 8 further specifies the environmental conditions under which the vehicle 2 is desired to travel from A to B. In this embodiment, the task model 8 is a Computation Independent Model (CIM). In this embodiment, the CIM will be represented using the Planning Domain Definition Language (PDDL). This tends to provide that a task model for a certain task may be easily and quickly specified by a user of the vehicle 2.

In this embodiment, the first vehicle model 9 is a Platform independent Model (PIM). Also in this embodiment, the second vehicle model 10 is a Platform Specific Model (PSM). In this embodiment, the first vehicle model 9 is a generic model corresponding to the vehicle 2, whereas the second vehicle model 10 is a model corresponding specifically to the vehicle 2. In other words, the first vehicle model 9 is a model for a generic vehicle, and the vehicle 2 (specifically described by the second vehicle model 10) is a specific instantiation of the generic vehicle.

In this embodiment, the second vehicle model 10 is a model that describes the following (the first vehicle model describes corresponding functionalities and structure for the generic vehicle): the functionality of hardware and software components of the vehicle 2, the structure of the vehicle 2, the behaviour of the vehicle 2, and any systems analysis associated with the vehicle 2.

The specification of the structure of the vehicle may include, for example, the organization of components within the vehicle 2, and/or the structure of data flowing in and out of the vehicle 2.

The specification of the behavior of the vehicle 2 may include, for example, a current state of the vehicle (e.g. values for position, velocity, and/or acceleration at a current point in time), descriptions of sequences or algorithms used by the vehicle 2, a specification of the vehicle dynamics (e.g. how fast the vehicle 2 can travel, and/or how fast the vehicle 2 can turn etc), a specification on the vehicle's ability to localize itself with respect to its surroundings, and a specification of the decision making abilities of the vehicle 2 (e.g. a measure of whether, given certain information, the autonomous vehicle 2 would make the same decision as a human given the same certain information).

In this embodiment, the modelling languages used to express the task model 8 (i.e. the CIM) during the time in which the vehicle 2 and its autonomous systems were designed (hereinafter referred to as "design-time") are the same as those used to express the task model 8 during the time in which the vehicle 2 is used to perform the task (hereinafter referred to as "run-time"). However, in other embodiments different modelling languages are used (for the task model 8) during design-time and run-time.

In this embodiment, the modelling languages used to express the first vehicle model 9 (i.e. the PIM) during the design-time are the same as those used to express the first vehicle model 9 during the run-time. However, in other embodiments different modelling languages are used (for the first vehicle model 9) during design-time and run-time.

In this embodiment, the modelling languages used to express the second vehicle model 10 (i.e. the PSM) during the design-time are the same as those used to express the second vehicle model 10 during the run-time. However, in other embodiments different modelling languages are used (for the second vehicle model 10) during design-time and run-time.

In this embodiment, the model transform system 12 comprises descriptions of mappings (or relations) that are possible between the models (i.e. the task model 8, the first vehicle model 9, and the second vehicle model 10), and any restriction/limitations thereon. In particular, the model transform system 12 comprises descriptions of relations between meta-models, or bases, for the task and vehicle models 8, 9, 10.

In this embodiment, the information in the model transform system 12 is defined by a user (such as a designer or operation of the vehicle 2).

The model transform system 12 will be described in more detail later below with reference to FIG. 3.

In this embodiment, the controller 14 uses the task model 8, the first vehicle model 9, the second vehicle model 10, and the model transform system 12 to determine whether or not the vehicle 2 (as modelled by the vehicle models 9, 10) is capable of performing the task (as modelled by the task model 8). This is described in more detail later below with reference to FIG. 3.

In this embodiment the display 16 displays the result determined by the controller 14 to the user (not shown). The display 16 may, for example, be a screen.

In this embodiment, the system validation process is implemented using a Planning Domain Definition Language (PDDL). More information on the PPDL may be found in the following papers which are incorporated herein by reference: "*PDDL—the Planning Domain Definition Language*", M. Ghallab, A. Howe, C. Knoblock, D. McDermott, A. Ram, M. Veloso, D. Weld, and D. Wilkins, AIPS, 1998, and "*Automated Planning: Theory and Practice*", M. Ghallab, D. Nau, and P. Traverso, Elsevier, 2004.

The following information regarding PDDL is useful in understanding the embodiment of the system validation process described below with reference to FIG. 3.

A planning problem for a system is expressed as:

$$P=(\Sigma, s_0, g)$$

where $\Sigma$ is a state transition system, $s_0$ is an initial state of a system described by some combination of predicates, and g is a set of goal states for the system.

$\Sigma$ is given by:

$$\Sigma=(S, A, \gamma)$$

where S is the a set of allowable states for the system (i.e. states that the system may be in), A is a set of actions that may be performed by the system and $\gamma$ is a state transition function.

A purpose of an automated planner is to find a plan π that transitions the initial state $s_0$ to a goal state in g, if such a plan exists.

PDDL provides a textual specification of this type of planning problem. Typically, PDDL comprises a domain file, which specifies a set of predicates and set of actions allowable in a problem, and a problem file, which specifies the initial state and a goal state, which a generated plan should transition between. Typically, PDDL style planning problems involve an abstracted description of an environment to affect. The predicates in this case describe what entities are allowed in problem space, where those entities are, etc. Actions that may be performed by the system describe changes to the system state, such as a crane picking up a box. PDDL is therefore particularly appropriate for run-time tasking of autonomous systems, where a system can determine the actions it needs to complete in order to achieve a goal.

Figure 3:
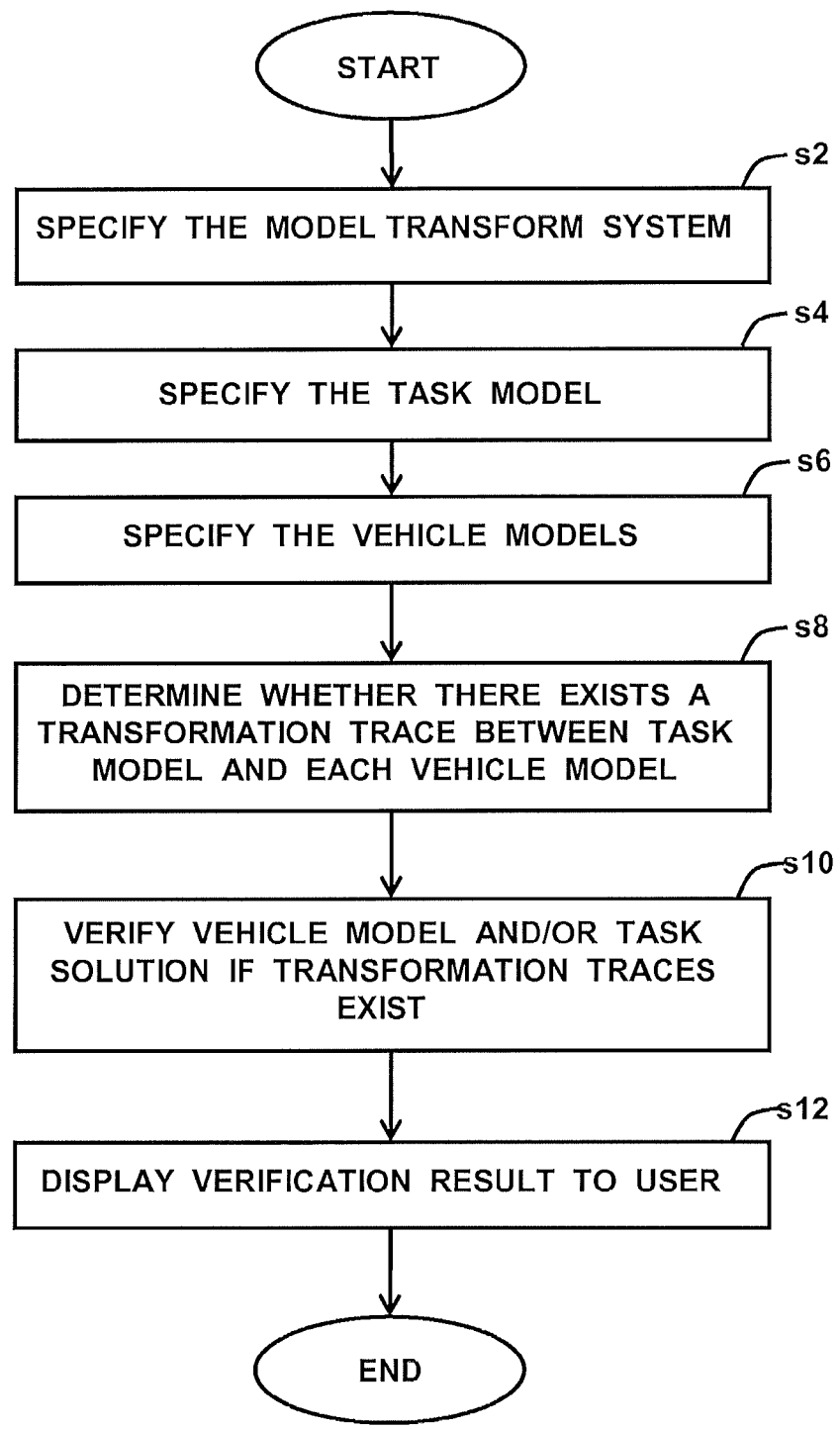
FIG. 3 is a process flow chart showing certain steps of the system validation process.

FIG. 3 is a process flow chart showing certain steps of the system validation process.

At step s2, the model transform system 12 is specified. In this embodiment, the model transform system 12 is specified by a designer of the autonomous vehicle 2. In this embodiment, the model transform system 12 comprises a set of possible mappings (or relations) between the task model 8, the first vehicle model 9 and the second vehicle model 10. The relations describe, for example, how an element of the task model 8 (e.g. requiring that the vehicle 2 navigates autonomously from location A to location B) relates to the capabilities available in the vehicle models 9, 10 (e.g. if vehicle 2 has the capability to navigate autonomously it will be represented in the first vehicle model 9 and second vehicle model 10).

At step s4, the task model 8 is specified. In this embodiment, the task model 8 is specified using an appropriate meta-model, hereinafter referred to as the first meta-model. The task model 8 is, in effect, an instantiation (e.g. a representation at a certain instant) of the first meta-model, i.e. the first meta-model provides a basis for the task model 8. In this embodiment, the task model 8 is, in effect, an initial state of a PDDL problem.

At step s6, the vehicle models 9, 10 are specified. In this embodiment, the vehicle models 9, 10 are specified using a common appropriate meta-model, hereinafter referred to as the second meta-model. Each of the vehicle models 9, 10 are, in effect, an instantiation of the second meta-model, i.e. the second meta-model provides a basis for the vehicle models 9, 10. In this embodiment, the first vehicle model 9 and second vehicle model 10 are, in effect, goal states of a PDDL problem.

At step s8, the controller 14 determines whether there exists a transformation (i.e. a transformation trace) between the task model 8 and the first vehicle model 9, and a transformation (i.e. a transformation trace) between the first vehicle model 9 and the second vehicle model 10. These are respectively achieved in this embodiment by determining a set of mappings (from the model transform system 12 specified at step s2) that transforms the task model 8 (initial state of the PDDL problem) to the first vehicle model 9 (a goal state of the PDDL problem), and by determining a set of mappings (from the model transform system 12) that transforms the first vehicle model 9 to the second vehicle model 10.

In this embodiment, this is achieved by determining a mapping from the first meta-model to the second meta-model. This, in effect, provides a basis of mappings that may be used to construct mappings from the task model 8 to the first vehicle model 9, and mappings from the first vehicle model 9 to the second vehicle model 10.

At step s10, if the transformations of step s8 exist, and if it is validated that the transformation constitutes correct plans with respect to the initial state (the task model 8) and the goal states (the vehicle models 9, 10), then the modelled vehicle is verified as being able to provide a solution to the modelled task. For example, if a particular capability is both required in the CIM, and present in the PIM at the required level of performance, then the PIM is verified for that capability. In this embodiment, both the initial and goal state are sufficiently rich to describe both the problem and solution (this may also be verified using the controller 14).

At step s12, the results of step s10 are displayed to a user using the display 16, i.e. it is displayed whether or not the vehicle 2 is verified as being able to perform the modelled task.

In this embodiment, the result of the system validation process is displayed to the user. However, in other embodiments such results (i.e. that a vehicle is validated for the task, or otherwise) are used in different ways instead of or in addition to being displayed to the user. For example, data corresponding to the result may provide an input to other systems of the autonomous vehicle 2, e.g. so that the vehicle perform a particular action depending on the result.

Thus, a method of and system for performing system validation is provided.

An advantage provided by the above described embodiments is that they tend to facilitate the provision of verification and validation capabilities for autonomous systems with respect to tasks that are set.

A further advantage provided by the above described embodiments is that a capability of validating and verifying an autonomous system during design-time and/or run-time tends to be provided. Due to the complexities and uncertainties of the environments in which some autonomous systems are required to operate in, it tends not to be appropriate to consider validation and verification as solely a design-time activity. This problem is addressed by the above described embodiments by providing a capability to verify and validate the autonomous system during run-time. The circumstances and context in which the system will be used tend to be able to be determined with greater accuracy during run-time. The above described method advantageously exploits this improved information.

A system for implementing the above described embodiment advantageously tends to portable (e.g. may be mounted on and carried by an autonomous vehicle), and reusable (i.e. may reused for different tasks and/or on different vehicles by modifying the relevant model 8, 9, 10, 12).

A further advantage of the above described embodiments is that the problem to be solved, a solution that may address that problem, and the specific implementation details of that solution are clearly separated. This tends to facilitate a user's understanding of the results of the system verification process and the options available to the user.

A further advantage provided by the above embodiments is that the task model, the vehicle models and the model transform system are separately defined entities. This advantageously tends to provided that one or more of these models may be changed/revised by a user without the need to alter the other models, i.e. the above described system for verifying the state of the vehicle with respect to the task has a degree of modularity.

A further advantage is that models and transforms are validated, or otherwise, through the existence, or otherwise, of a suitable transformation trace or plan. Therefore, one-way 'model checking' tends to be facilitated, whereas conventional 'MDA' based approaches support one-way 'model creation' which is not amenable to the above described verification system tasks.

A further advantage is that if the task model cannot be fully related to a vehicle model through the model transformation specification represented in the actions, the validation will fail. This is desirable behaviour as it advantageously tends to ensure that the transform specification is sufficient given the model descriptions.

A further advantage is that a properly defined CIM (task model) may be reused both as a goal state to attain when determining the actions an autonomous system will have to carry out to achieve that state, and as an initial state which may be used as the basis of a run-time verification framework and 'transformed' into the PIM/PSM system model.

A further advantage is that any of the models (i.e. task or vehicle models) and/or any of the information contained in the model transform system, tend to be able to be altered at any time (either remotely or directly). This advantageously provides that the information used to verify/validate the vehicle may be changed easily, for example, if the task changes or the vehicle capabilities need to be revised.

It should be noted that certain of the process steps depicted in the flowchart of FIG. 3 and described above may be omitted or such process steps may be performed in differing order to that presented above and shown in FIG. 3. Furthermore, although all the process steps have, for convenience and ease of understanding, been depicted as discrete temporally-sequential steps, nevertheless some of the process steps may in fact be performed simultaneously or at least overlapping to some extent temporally.

Apparatus for implementing the vehicle verification system 6, and performing the above described method steps, may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine readable storage medium such as computer memory, a computer disk, ROM, PROM etc., or any combination of these or other storage media.

In the above embodiments, the vehicle is an autonomous land-based vehicle. However, in other embodiments the vehicle is a different type of vehicle, for example an unmanned air vehicle.

In the above scenarios/embodiments, the task comprises the vehicle navigating along the road, from a first point A to a second point B, under adverse environmental conditions. However, in other scenarios/embodiments the task is a different task, for example a task comprising any number of sub-tasks, e.g. navigating from one position to another, avoiding certain obstacles, surveying an area, surveillance and/or interception of an entity, collecting, transporting and/or delivery of a load etc. Moreover, a task may require the vehicle to operate in any environmental conditions.

In the above embodiments, the models and components of the vehicle verification system (i.e. the task model, the first vehicle model, the second vehicle model, the model transform system, the controller, and the display) are situated onboard the vehicle. However, in other embodiments one or more of these models/components may be either wholly or partially remote from the vehicle. For example, in other embodiments the vehicle verification system is remote from the vehicle and may be used by a remote user to assess whether the vehicle is capable of performing a certain task before instructions are transmitted from the remote user to the vehicle.

In the above embodiments, the task and vehicle models, and the information in the model transform system are user defined. However, in other embodiments one or more of the models and/or some or all of the information in the model transform system may be provided in a different way. For example, in other embodiments, information about environmental conditions in which the vehicle is operating and/or information about actions that may be performed by the vehicle may be provided by one or more appropriate sensors. Data provided by sensors typically has uncertainty associated with it. In such cases the data may be interpreted, combined or fused in order to perceive pertinent information.

In the above embodiments, the system validation process is implemented using a Planning domain Definition Language (PDDL). However, in other embodiments, a different appropriate language is used.

In the above embodiments, the task model (Computation Independent Model) is represented using PDDL. However, in other embodiments the task model may be represented using any appropriate language or languages, e.g. Systems Modelling Language (SysML), The Architecture Analysis & Design Language (AADL), OWL Web Ontology Language, Unified Modelling Language (UML) etc.

In the above embodiments, the first vehicle model (Platform Independent Model) is implemented using PDDL. However, in other embodiments the first vehicle model may be represented using any appropriate language or languages, e.g. Systems Modelling Language (SysML), The Architecture Analysis & Design Language (AADL), OWL Web Ontology Language, Unified Modelling Language (UML) etc.

Also, the second vehicle model (Platform Specific Model) may be represented using any appropriate language or languages, e.g. Systems Modelling Language (SysML), The Architecture Analysis & Design Language (AADL), Planning Domain Definition Language (PDDL), OWL Web Ontology Language, Unified Modelling Language (UML) etc.

In the above embodiments, the vehicle is validated with respect to the task based on both the first vehicle model (PIM) and the second vehicle model (PSM). However, in other embodiments the vehicle may be validated using only one of these models (e.g. the PSM). Also, in other embodiments additional models (e.g. any number of models in addition to, or instead of, the first and/or second vehicle models) may be used to determine whether the vehicle is validated.

In the above embodiments, the task model is specified using the first meta-model. Also, the vehicle models are specified using the common second meta-model. However, in other embodiments the target, the first vehicle model, and/or the second vehicle model may be specified using a different appropriate meta model. For example, in other embodiments the models may each be specified using a different meta-model. Also, in other embodiments, each model may be specified using the same meta-model.

In this embodiment, the modelling languages used to express the task model during the design-time are the same as those used to express the task model during the run-time. Also, the modelling languages used to express the first vehicle model during the design-time are the same as those used to express the first vehicle model during the run-time. Also, the modelling languages used to express the second vehicle model during the design-time are the same as those used to express the second vehicle model during the run-time.

However, in other embodiments different modelling languages are used (to express one or more of the models) during design-time and run-time. In certain situations, representations for the models at design-time may not be used directly during run-time without modification. Also, the scope of the models may not necessarily be the same during design-time and run-time. Some design-time information may be redundant at run-time, hence including it tends to be unnecessary and may slow processing. Similarly, some information will only be available at run-time, so including it explicitly in design-time models adds to their complexity.

In other embodiments, the above described design-time/run-time difference is addressed by implementing a Runtime Specific Model (RSM) with additional model transformations specified between it and the PSM. The RSM uses runtime specific representations, and only includes information relevant to run-time operation. This tends to reduce the need for non-relevant information being included in the models at run-time. However, the distinction between run-time task models and run-time system models ends to be hidden by this approach.

In other embodiments, the above described design-time/run-time difference is addressed by implementing distinct sets of MDA models for design-time and run-time, which are related by 'design-time to run-time' model transformations. In other words, in other embodiments different modelling representations are used in design-time compared to run-time. This tends to allows for the use of appropriate representations at both design-time and run-time, and tends to allows for the specification of the run-time CIM as distinct, but related to, the design-time CIM. Therefore, run-time 'problems' tend to be advantageously related to run-time 'system solutions'.

In the above embodiments, the vehicle is validated with respect to the task by determining whether there exists a transformation from the task model to the first vehicle model, and from the first vehicle model to the second vehicle model. However, in other embodiments the system may be validated by determining whether a model transformation exists between the task model and either of the vehicle models (for example, the second vehicle model—in which case the first vehicle model may be by-passed or omitted), or whether there exists a transformation from either of the vehicle models to the task model.

In the above embodiments, the autonomous vehicle is validated, with respect to the task, if transformations exist between both the task model and the first vehicle model, and between the first vehicle model and the second vehicle model. However, in other embodiments a different number of appropriate models may be used, and the vehicle may be validated if there exists a transformation from the task model to the vehicle model via any number of the different models, e.g. a vehicle may be validated if there exists transformations or mappings from the task model, to a first intermediate model, from a first intermediate model to a second intermediate model, from a second intermediate model to a third intermediate model, and from the third intermediate model to the vehicle model.

The invention claimed is:

1. A method performed on an autonomous vehicle designed to operate in a plurality of environments, the method comprising:
   (a) validating, via one or more systems onboard the autonomous vehicle, capabilities of the autonomous vehicle designed to operate in the plurality of environments with respect to a task to be performed in a current environment, the validation of capabilities including:
   providing a first model, the first model corresponding to the task to be performed and the current environment;
   providing a further model, the further model corresponding to designed features of the autonomous vehicle;
   providing a plurality of mappings from one model to another model;
   determining whether there exists a transformation trace either (i) from the first model to the further model, or (ii) from the further model to the first model, wherein each transformation trace comprises one or more of the specified mappings; and
   evaluating the capabilities of the autonomous vehicle with respect to the task to be performed in the current environment, the evaluation outcome being dependent upon existence of the transformation trace;
   (b) validating the first and further models for the task to be performed in the current environment based on the existence of the transformation trace between the first and further models;
   (c) inputting data corresponding to a result of step (a) and (b) into other systems of the autonomous vehicle; and
   (d) performing a specified action of the autonomous vehicle, when the validated transformation trace exists and the capability of the autonomous vehicle with respect to the task to be performed in the current environment is verified.

2. The method according to claim 1, comprising:
   providing, via one or more sensors, data about environmental conditions in which the autonomous vehicle is operating.

3. The method according to claim 1, comprising:
   providing, via one or more sensors, information about actions that may be performed by the autonomous vehicle.

4. The method according to claim 1, wherein evaluating the capabilities of the autonomous vehicle with respect to the task comprises:
   determining whether the autonomous vehicle is capable of performing the task in the current environment.

5. The method according to claim 4, wherein it is determined that the autonomous vehicle is capable of performing the task in the current environment if the transformation trace exists.

6. The method according to claim 1, comprising:
   specifying a second further model, the second further model corresponding to the autonomous vehicle; wherein
   the determining whether there exists a transformation trace includes:
   determining whether there exists either:
   (i) a transformation trace from the first model to the second further model and a transformation trace from the second further model to the further model; or
   (ii) a transformation trace from the further model to the second further model and a transformation trace from the second further model to the first model; and
   each transformation trace includes one or more of the specified mappings.

7. The method according to claim 1, wherein:
   a first meta-model provides a basis for the first model;
   a second meta-model provides a basis for the further model; and
   the determining whether there exists a transformation trace includes:
   determining whether there exists a transform or mapping from the first meta-model to the second meta-model; wherein a transform or mapping from the first meta-model to the second meta-model provides a basis for the transformation trace either (i) from the first model to the further model, or (ii) from the further model to the first model.

8. The method according to claim 1, wherein the first model is a Computation Independent Model.

9. The method according to claim 1, wherein a further model is one of the following: (i) a Platform Independent Model, or (ii) a Platform Specific Model.

10. The method according to claim 1, wherein the method is implemented using Planning Domain Definition Language.

11. The method according to claim 1, wherein:
there are two further models;
one of the two further models is a Platform Independent Model; and
the other of the two further models is a Platform Specific Model.

12. Apparatus for mounting onboard an autonomous vehicle designed to operate in at least one environment, the apparatus configured for validating capabilities of the autonomous vehicle with respect to a task to be performed in a current environment, the apparatus comprising:
one or more processors arranged to:
determine whether there exists a transformation trace either (i) from a first model to a further model, or (ii) from the further model to the first model, and each transformation trace comprising one or more of a plurality of mappings; and
evaluate the capabilities of the autonomous vehicle with respect to the task to be performed in the current environment, the evaluation outcome being dependent upon the existence of the transformation trace; wherein
the first model corresponds to the task to be performed in the current environment;
the further model corresponds to designed features of the autonomous vehicle; and
the plurality of mappings are specified from one model to another model;
validate the first and further models for the task to be performed in the current environment based on the existence of the transformation trace between the first and further models; and
perform a specified action of the autonomous vehicle, when the validated transformation trace exists and the capability of the autonomous vehicle with respect to the task to be performed in the current environment is verified.

13. The apparatus according to claim 12, in combination with the autonomous vehicle wherein the apparatus is mounted.

14. A machine readable storage medium for storing a program or at least one of a plurality of programs in non-transitory form, for placement into a computer system, such that when executed will cause the computer system to perform the functions of:
(a) validating, via one or more systems onboard an autonomous vehicle designed to operate in at least one environment, capabilities of the autonomous vehicle with respect to a task to be performed in a current environment, the evaluating of capabilities including:
providing a first model, the first model corresponding to the task to be performed in the current environment;
providing a further model, the further model corresponding to designed features of the autonomous vehicle;
providing a plurality of mappings from one model to another model;
determining whether there exists a transformation trace either (i) from the first model to the further model, or (ii) from the further model to the first model, wherein each transformation trace comprises one or more of the specified mappings; and
evaluating the capabilities of the autonomous vehicle with respect to the task to be performed in the current environment, the evaluation outcome being dependent upon existence of the transformation trace;
(b) validating the first and further models for the task to be performed in the current environment based on the existence of the transformation trace between the first and further models;
(c) inputting data corresponding to a result of step (a) and (b) into other systems of the autonomous vehicle; and
(d) performing a specified action of the autonomous vehicle, when the validated transformation trace exists and the capability of the autonomous vehicle with respect to the task to be performed in the current environment is verified.

15. The machine readable medium according to claim 14, wherein the program or plurality of programs are arranged on a computer system such that when executed by the computer system or one or more processors will cause the computer system or the one or more processors to perform the functions of the stored program.

* * * * *